United States Patent Office 2,775,580
SULFOBENZYL LIGNINS

Virgil Scarth, Bartlesville, Okla., assignor to Phillips Petroleum Company, a corporation of Delaware No Drawing. Application May 25, 1953,
Serial No. 357,340

19 Claims. (Cl. 260—124)

This invention relates to lignins. In one aspect it relates to sulfobenzyl lignins as new compositions of matter and methods for their preparation.

Water dispersible sulfobenzyl lignins are found to be useful in reducing water loss in aqueous hydraulic cement slurries, for well cementing, to increase the setting time of the cement, to reduce water loss and to increase the gel strength of drilling muds.

The compounds of my invention broadly may be termed sulfobenzyl lignins. They sometimes may be called sulfobenzyl lignin ethers, although this latter term is not preferred. The sulfobenzyl lignins according to my invention include those having from 1 to 4 carbon atoms in the side chain of the sulfobenzyl radical. One carbon is always present and is the group which when taken with the benzene ring forms the benzyl group. My compounds, however, contain sulfonated benzyl groups which contain a sulfonate group in either ortho, meta or para position with respect to the side chain. There are 6 alpha substituted sulfobenzyl lignins and one unsubstituted sulfobenzyl liginin. This latter compound may be represented by the following formulation,

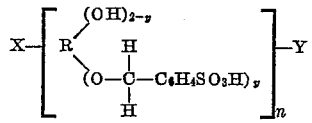

In the formulations in this specification and claims I represent lignin by the empirical formula

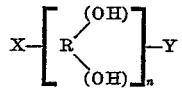

in which R is considered a lignin residue, the two —OH groups are reactive hydroxyl groups of a lignin unit,

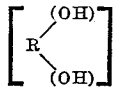

is a lignin unit, $y$ is the average degree of substitution, $n$ the number of lignin units per molecule and X and Y are the end groups of a lignin chain. I can make alkali metal or ammonium salts, alkaline earth metal or other metal salts by substituting the desired metal cations for the acid hydrogen of the sulfonate group $SO_3H$. In general it is merely necessary to add sufficient sodium or other hydroxide to the benzyl acid sulfonate compound in formation of the lignin sulfonate to form the corresponding sulfonate salt or the sodium or potassium salt can be originally prepared and subsequently converted to another salt.

I can make the six following substituted sulfobenzyl lignins according to my invention:

(1) Alpha-methylsulfobenzyl lignin,

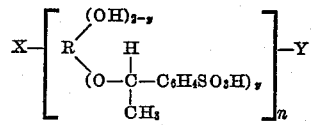

(2) Alpha-ethylsulfobenzyl lignin,

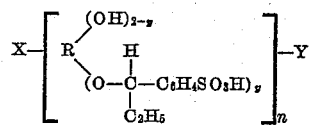

(3) Alpha-n-propylsulfobenzyl lignin,

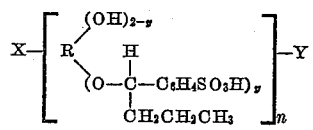

(4) Alpha-isopropylsulfobenzyl lignin,

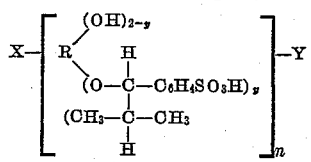

(5) Alpha-alpha-di-methylsulfobenzyl lignin,

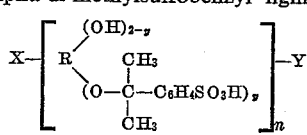

(6) Alpha-methyl-alpha-ethylsulfobenzyl lignin,

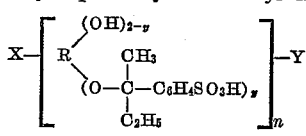

Generically these compounds may be illustrated by the following formulation

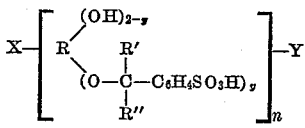

in which R' and R" may be methyl, ethyl, propyl and isopropyl groups, with the total number of side chain carbon atoms attached to the benzene ring residue being a maximum of 4. The R' may be an unsubstituted hydrogen atom as well as one of the above-mentioned alkyl groups. The R" may also be an unsubstituted hydrogen atom as well as one of the above mentioned alkyl groups. X and Y are end groups of a lignin chain molecule. $y$ is the degree of substitution and $n$ the number of lignin groups per molecule. When neither of the hydrogen atoms are substituted there is only one carbon atom attached to the benzene ring and the entire group is the sulfobenzyl group.

I can make the alkali metal and ammonium salts of the six above enumerated sulfobenzyl lignins, those salts of alpha-methylsulfobenzyl lignin are (1) alpha-methyl-sodiumsulfobenzyl lignin, alpha-methylpotassiumsulfobenzyl lignin, alpha-methyl-lithiumsulfobenzyl lignin, alpha-methylrubidiumsulfobenzyl lignin and alpha-methylcesiumsulfobenzyl lignin. The ammonium salt is alpha-methyl-ammoniumsulfobenzyl lignin.

The corresponding alkali metal salts of (2) alpha-ethylsulfobenzyl lignin are alpha-ethylsodiumsulfobenzyl lignin, alpha-ethylpotassiumsulfobenzyl lignin, alpha-ethyllithiumsulfobenzyl lignin, alpha-ethylrubidiumsulfobenzyl lignin and alpha-ethylcesiumsulfobenzyl lignin. The ammonium salt is alpha-ethylammoniumsulfobenzyl lignin.

The corresponding alkali metal salts of (3) alpha-n-propylsulfobenzyl lignin are alpha-n-propylsodiumsulfobenzyl lignin, alpha-n-propylpotassiumsulfobenzyl lignin, alpha-n-propyllithiumsulfobenzyl lignin, alpha-n-propylrubidiumsulfobenzyl lignin and alpha-n-propylcesiumsulfobenzyl lignin. The corresponding ammonium salt is alpha-n-propylammoniumsulfobenzyl lignin.

The corresponding alkali metal salts of (4) alpha-isopropylsulfobenzyl lignin are alpha-isopropylsodiumsulfobenzyl lignin, alpha-isopropylpotassiumsulfobenzyl lignin, alpha-isopropyllithiumsulfobenzyl lignin, alpha-isopropylrubidiumsulfobenzyl lignin, and alpha-isopropylcesiumsulfobenzyl lignin. The corresponding ammonium salt is alpha-isopropylammoniumsulfobenzyl lignin.

The corresponding alkali metal salts of (5) alpha-alpha-di-methylsulfobenzyl lignin are alpha-alpha-di-methylsodiumsulfobenzyl lignin, alpha-alpha-di-methylpotassiumsulfobenzyl lignin, alpha-alpha-di-methyllithiumsulfobenzyl lignin, alpha-alpha-di-methylrubidiumsulfobenzyl lignin and alpha-alpha-di-methylcesiumsulfobenzyl lignin. The corresponding ammonium salt is alpha-alpha-di-methylammoniumsulfobenzyl lignin.

The corresponding alkali metal salts of (6) alpha-methyl-alpha-ethylsulfobenzyl lignin are alpha-methyl-alpha-ethylsodiumsulfobenzyl lignin, alpha-methyl-alpha-ethylpotassiumsulfobenzyl lignin, alpha-methyl-alpha-ethyllithiumsulfobenzyl lignin, alpha-methyl-alpha-ethylrubidiumsulfobenzyl lignin, and alpha-methyl-alpha-ethylcesiumsulfobenzyl lignin. The corresponding ammonium salt is alpha-methyl-alpha-ethylammoniumsulfobenzyl lignin.

I can make the alkaline earth metal salts and other metal salts of the above named six sulfobenzyl lignins, for example, the calcium, magnesium, strontium and barium sulfobenzyl lignins, such as calcium sulfobenzyl lignin; the beryllium, magnesium, zinc, cadmium and mercury sulfobenzyl lignins, such as magnesium sulfobenzyl lignin; the aluminum, agllium, indium and thallium sulfobenzyl lignins, such as aluminum sulfobenzyl lignin; the titanium, zirconium, cerium, germanium, tin and lead sulfobenzyl lignins, such as titanium sulfobenzyl lignin; the colombium, tantalum, arsenic, antimony and bismuth sulfobenzyl lignins, such as tantalum sulfobenzyl lignin; the chromium, molybdenum, and tungsten sulfobenzyl lignins, such as chromium sulfobenzyl lignin; manganese sulfobenzyl lignin and the iron, cobalt and nickel sulfobenzyl lignins, such as cobalt sulfobenzyl lignin.

The chemical structure of lignin is unknown at the present time. However, it is known to have at least one methoxy group, at least one phenolic hydroxyl group and one or more alcoholic hydroxyl groups which latter groups include both primary and secondary alcoholic groups. The appearance of an "O" attached to the "R" in the formulations emphasizes the point that my compounds are ethers.

I disclose a new composition of matter characterized by the following formulation

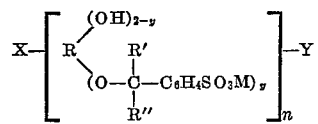

in which R represents a lignin residue, R' and R" represent groups selected from among H and alkyl radicals having 1 to 3 carbon atoms per radicals, the grouping

having a maximum of 4 carbon atoms, M represents an element or group selected from among H, NH₄, and a metal, y represents the average degree of substitution, n represents the number of units per lignin molecule, and X and Y represent end groups of a lignin molecule.

As an illustration of the operation of the process of my invention for preparing sulfobenzyl lignin I will describe methods for the preparation of sulfobenzyl lignin.

*Example I*

100 parts by weight of a pine wood lignin were slurried in 500 parts by weight of water. To this slurry was added a solution of 150 parts by weight of sodium hydroxide dissolved in 250 parts by weight of water. The alkaline slurry was stirred and heated to a temperature of about 131°–149° F. (55° to 65° C.) and to the resulting solution was added 75 parts by weight of sodium alpha-chlorotoluenesulfonate. The reaction taking place between the sodium alpha-chlorotoluenesulfonate and the lignin may be illustrated by the following

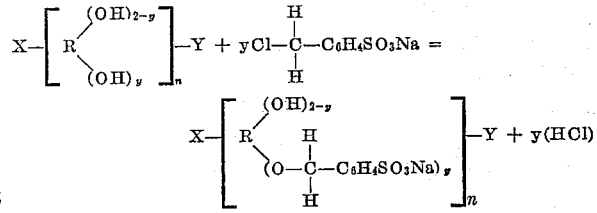

The reaction mixture was stirred and heated for about one hour after which time the heating was stopped and the material allowed to cool to about 122° F. (50° C.). The cooled reaction material was filtered. All of the products were soluble hence all passed through the filter. About 250 parts by weight of water were used to rinse the reflux condenser and the filter and this wash water was added to the product. The resulting reaction solution was concentrated slightly in a draft oven at 122° F. (50° C.) for 16 hours.

The concentrated sodium sulfobenzyllignin solution was then poured into 5 volumes of a formula 30 alcohol. The alcoholic solution was decanted leaving a black gummy residual resin. Water was added to dissolve the resin. This water solution was poured into 5 volumes of a 50–50 formula 30 alcohol-acetone mixture. A black gummy resinous material was precipitated. This latter solution was decanted and the residue was dissolved in a volume of methanol equal to eight times the volume of water with which the original pine wood lignin was slurried. An equal volume of formula 30 alcohol was added to the methanol solution. A flocculent precipitate formed which could not be readily separated by filtration. This alcoholic solution was evaporated to dryness in a draft oven at 140° F. The black residue was extracted by stirring with absolute ethanol and then filtered. This extraction and filtration operation was repeated several times and a resulting finely divided black powder was washed with absolute ethanol and ether. This finally washed product was dried in a vacuum over a desiccant and yielded 289.5 parts by weight. A sample of this finally dried material was further dried in vacuum over P₂O₅ at 212° F. for analysis.

This P₂O₅ dried material contained 22.0 percent sodium; 1.58 percent chloride; 37.8 percent sodium carbonate; and 3.56 percent sulfur. These values indicated a product of 59.6 percent sodium lignin benzyl sulfonate with a degree of substitution of 1.2 sulfobenzyl groups per lignin unit and 0.9 sodium per lignin unit. The above analyses are in percent by weight.

Example 2

100 parts by weight of a pine tree lignin was slurried in a methanol solution of sodium hydroxide containing 150 parts by weight of sodium hydroxide in about 750 parts by weight methyl alcohol. This mixture was heated to 122° F. (50° C.) for one hour and then 150 parts by weight of sodium alpha-chlorotoluenesulfonate (sodium alpha-chlorobenzylsulfonate), was added. This mixture was heated at a temperature of about 122°–129° F. (50°–54° C.) and kneaded for four hours. Most of the methanol was then removed by vacuum leaving a hard, gummy, hygroscopic black product. This product was removed from the reaction vessel and macerated in the presence of a formula 30 alcohol in a mechanical mixer. The macerated material was filtered and washed with ether leaving a cocoa colored product on the filter. This product was dried in vacuum over a solid desiccant. Even though dried over a desiccant the material appeared not to be dried and was still very hygroscopic. This material was soluble in water and in methanol. This vacuum dried product was further washed by vigorously agitating with absolute ethanol until the washings were nearly clear. After the final wash with the absolute ethanol the material was washed with ether and the product dried over a solid desiccant.

The resulting product represented a yield of 122.5 parts by weight. A small sample was removed for analysis and was further dried in vacuum over $P_2O_5$ at 212° F. This $P_2O_5$ dried sample yielded sodium 16.8 percent; chloride 5.7 percent; sodium carbonate 21.4 percent and sulfur 4.2 percent. All of these percents were by weight. These values indicated that the final product contained 69.2 weight percent sodium lignin benzyl sulfonate with a degree of substitution of 1.5 sulfobenzyl groups per lignin unit and 0.4 sodium per lignin unit.

In view of the above examples it is clear that lignin reacts with sodium alpha-chlorobenzylsulfonate in either an aqueous or alcoholic alkali solution to form a water-soluble sodium ligninbenzylsulfonate. The structure of lignin has not been definitely established, but it is indicated by the above analysis that there are two fairly active hydroxyl groups in each polymer unit of lignin. The solubility of lignin in alkali is attributed to the phenolic character of one of the hydroxyl groups and to the enolization of a carbonyl group. It seems more than coincidental that the degree of substitution of sulfobenzyl groups in a lignin unit plus the excess sodium should in both of the above examples total about two. These results appear to verify the point that there are at least two reactive groups in each lignin polymer unit.

It is believed that the preparation according to my invention of a sulfonatedbenzyllignin results in an entirely different type of material than the treatment of cellulose with a benzyl sulfonate. Cellulose is believed to be made up of cellulose units containing three reactive hydroxyl units which hydroxyl units may be reacted with various reagents. The cellulose unit is believed to be made up of an anhydrous glucose unit having an empirical formula of $C_6H_7O_2$ to which are attached the three reactive hydroxyl groups. If all three of the hydrogens of these three reactive hydroxyl groups of cellulose are replaced by substituting groups the cellulose is considered to have a degree of substitution of 3. This degree of substitution is the maximum possible. It is believed that there are two anhydroglucose units per polymer unit of cellulose. In "The Chemistry of Cellulose" by Emil Heuser (1944), John Wiley & Son Inc., N. Y., Figure 1, page 4, is given the following "Molecular chain formula of cellulose":

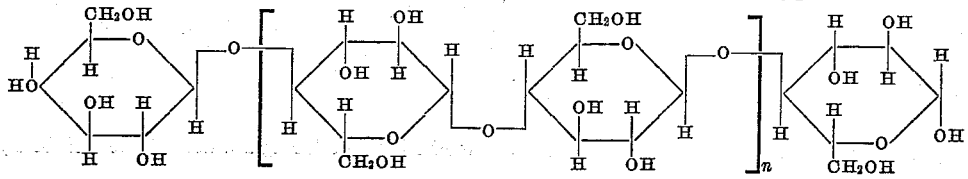

The portion of the above chain formula cellulose included within the brackets is a cellulose polymer unit and this contains two anhydroglucose units each having an empirical formula of $C_6H_{10}O_5$, which formula is the same as $C_6H_7O_2(OH)_3$. It will be noted that in each of these anhydro glucose units, there are 3 hydroxyl groups.

No ones knows what lignin is, except that it is definitely not cellulose. It may be a polymer of guaiacol. Emil Ott in "High Polymers," volume V, "Cellulose and Cellulose Derivatives" (1946), Interscience Publishers, Inc., N. Y., on page 466 gives several possible formulas for lignin beginning with the last full paragraph on this page. Ott states "according to Freudenberg, when one of these derivatives, for example, guaiacylglycerol (a more descriptive name would be 1-(4-hydroxy-3-methoxyphenyl)-1,2,3-propanetriol) (X) or acetylguaiacylcarbinol (more descriptive names would be acetyl(4-hydroxy-3-methoxyphenyl)carbinol or 1-hydroxy-1-(4-hydroxy-3-methoxyphenyl)-2-propanone) (XI), may unite with any other in such a way that ether linkages are formed (XII and XIII). Several of such building stones can react with each other thus forming larger units (XIV and XV)." The above mentioned guaiacylglycerol is shown as having the following formula on page 467 of Ott,

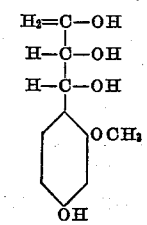

Two of these materials as illustrated by this formula may react with each other with loss of a mol of water, the reacting groups being the hydroxyl adjacent the methoxy group of one unit and the hydroxyl nearest the end of the benzene ring and meta to the methoxy group of another unit. In this way two of the above illustrated units are combined and in this type of material there is no end to the number of such units which react with the loss of water to form long lignin chains.

It will be obvious that polymers formed from the above lignin unit are entirely different from the polymers formed from the cellulose units illustrated above. Thus due to the different types of polymer units of cellulose and lignin the resulting cellulose and lignin should then possess different chemical and physical properties.

In the above examples, the alpha-chlorobenzylsulfonate (alpha-chlorotoluene sulfonate) was the para isomer, i. e., the sulfonte group was para to the alkyl side group. While this para isomer was used it is obvious that the ortho and meta isomers could also be used to produce the lignin sulfonate of my invention.

In carrying out the reactions of lignin with the chlorobenzylsulfonate the reaction is carried out in an alkaline solution so that the alkali will consume the hydrogen chloride liberated in the reaction to make certain that the reaction will go as nearly as possible to completion.

Lignin itself is a dark colored material and accordingly the aqueous or alcoholic solutions or suspensions of lignin are dark colored. Likewise the final lignin benzyl sulfonate materials are also dark colored.

The formula 30 alcoholic reagent mentioned in the examples is a standard denatured alcohol formula.

When the sulfobenzyl lignin of my invention is made with sodium hydroxide as one of the agents it is obvious that the resulting product will be the sodium benzyl lignin sulfonate derivative. If potassium hydroxide were the alkali used the resulting product would be the potassium benzyl lignin sulfonate derivative, while if, for example, calcium hydroxide were the alkali, calcium benzyl lignin sulfonate derivative would be produced. The metal or ammonium benzyl lignin sulfonates as produced herein appear in general to be more dispersable in water than the free acid.

The sodium given in the above analyses over and above that given as sodium carbonate and the sodium sulfonate is believed to have replaced a portion of the hydrogen of other hydroxyl groups of the lignin residue. In water solution this sodium hydrolyzes relatively easy to reform a hydroxyl group. The substitution of the benzyl sulfonate group is believed to have replaced largely a hydrogen atom from alcoholic hydroxyl groups of the lignin residue.

In the examples given hereinabove, alpha chlorotoluene sulfonate was used as a reacting material. Alpha bromotoluene sulfonate is equally useful in preparing my compounds since the bromo derivative is the full equivalent of the chloro derivative. However, for economic reasons, the chloro compound is ordinarily preferred unless overshadowed by some other consideration.

While certain embodiments of the invention have been described for illustrative purposes, the invention obviously is not limited thereto.

Having disclosed my invention, I claim:

1. A new composition of matter characterized by the following formulation

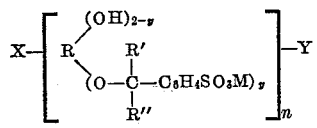

in which R represents a lignin residue, R' and R" represent groups selected from among H and alkyl radicals having 1 to 3 carbon atoms per radical, the grouping

having a maximum of 4 carbon atoms, M represents an element or group selected from among H, NH$_4$, and a metal, y represents the average degree of substitution, n represents the number of units per lignin molecule, and X and Y represent end groups of a lignin molecule.

2. A new composition of matter characterized by the following formulation

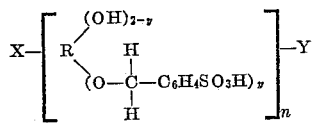

in which R represents a lignin residue, y represents the average degree of substitution, n represents the number of units per lignin molecule, X and Y represent end groups of a lignin chain.

3. A new composition of matter characterized by the following formulation

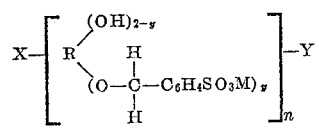

in which R represents a lignin residue, y represents the average degree of substitution, M represents an element or group selected from among H, NH$_4$, and a metal, n represents the number of units per lignin molecule, X and Y represent end groups of a lignin chain.

4. A new composition of matter characterized by the following formulation

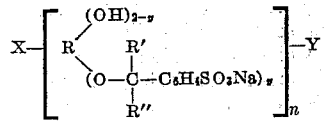

in which R represents a lignin residue, R' and R" represent groups selected from among H and alkyl radicals having 1 to 3 carbon atoms per radical, the grouping

having a maximum of 4 carbon atoms, y represents the average degree of substitution, n represents the number of units per lignin molecule, and X and Y represent end groups of a lignin molecule.

5. A new composition of matter characterized by the following formulation

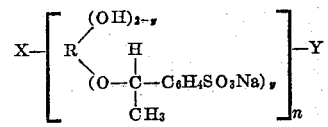

in which R represents a lignin residue, y represents the average degree of substitution and n represents the number of units per lignin molecule and X and Y represent end groups of a lignin molecule.

6. A new composition of matter characterized by the following formulation

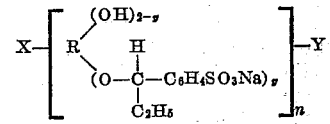

in which R represents a lignin residue, y represents the average degree of substitutions, n represents the number of units per lignin molecule, and X and Y represent end groups of a lignin chain.

7. A new composition of matter characterized by the following formulation

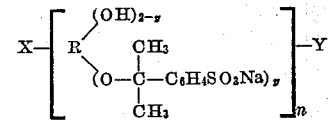

in which R represents a lignin residue, y represents the average degree of substitution, n represents the number of units per lignin molecule, and X and Y represent end groups of a lignin chain.

8. A new composition of matter characterized by the following formulation

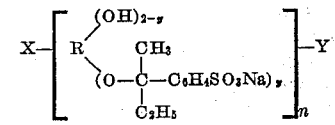

in which R represents a lignin residue, y represents the average degree of substitution, n represents the number of units per lignin molecule, and X and Y represent end groups of a lignin molecule.

9. A method for producing a water soluble sulfobenzyl lignin comprising reacting lignin with an alpha-halobenzyl sulfonate selected from the group consisting of alpha-chlorobenzyl sulfonate and alpha-bromobenzyl sulfonate in an alkaline solution and recovering the water soluble sulfobenzyl lignin from the reaction mixture.

10. A method for producing a water soluble sulfobenzyl lignin comprising reacting lignin with alpha-chlorobenzyl sulfonate in an alkaline solution.

11. A method for producing a water soluble sulfobenzyl lignin comprising reacting lignin with alpha-bromobenzyl sulfonate in an alkaline solution.

12. The method of claim 10 wherein the alkaline solution is an aqueous solution.

13. The method of claim 10 wherein the alkaline solution is a methyl alcohol solution.

14. A method for producing a sulfobenzyl lignin having the following formula

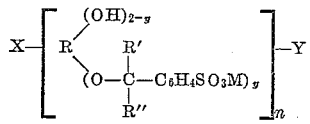

in which R represents a lignin residue, R' and R'' represent groups selected from among H and alkyl radicals having 1 to 3 carbon atoms per radical, the grouping

containing a maximum of 4 carbon atoms, M represents an element selected from the group of elements consisting of the alkali metals, ammonium and the alkaline earth metals, $y$ represents the average degree of substitution of the lignin residue, $n$ represents the number of lignin units per molecule, and X and Y are end groups of a lignin molecule, comprising reacting lignin in an alkaline solution with a compound having the formulation

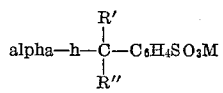

in which $h$ represents a halogen atom selected from the group consisting of chlorine and bromine, R' and R'' represent alkyl groups and H atoms, the grouping

containing a maximum of 4 carbon atoms, and M is an element selected from the group consisting of H, NH$_4$ and a metal, and recovering said sulfobenzyl lignin from the reaction mixture.

15. The method of claim 14 wherein the compound having the formulation

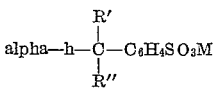

is alpha-chloro-benzyl.

16. The method of claim 14 wherein the alkaline solution is an aqueous solution.

17. The method of claim 14 wherein the alkaline solution is a methyl alcohol solution.

18. The method of claim 14 wherein the compound having the formulation

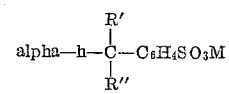

is alpha-bromo-benzyl.

19. A method for producing a water soluble solfobenzyl lignin having the following formula

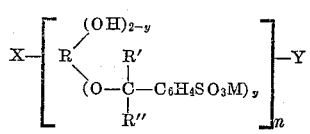

in which R represents a lignin residue, R' and R'' represent groups selected from among H and alkyl radicals having 1 to 3 carbon atoms for radical, the grouping

containing a maximum of 4 carbon atoms, M represents an element selected from the group of elements consisting of the alkali metals, ammonium and the alkaline earth metals, $y$ represents the average degree of substitution of lignin unit, $n$ represents the number of lignin units per molecule, X and Y are end groups of a lignin molecule, comprising reacting lignin in an alkaline solution with a compound having the formulation

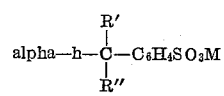

in which h represents a halogen selected from the group consisting of chlorine and bromine, R' and R'' represent alkyl groups and H atoms, the grouping

containing a maximum of 4 carbon atoms, and M is an element selected from the group consisting of the alkali and alkaline earth metals and ammonium, treating the reaction mixture with a liquid comprising ethyl alcohol, recovering the solid material from the alcohol as the water soluble sulfobenzyl lignin product of the process.

References Cited in the file of this patent

UNITED STATES PATENTS

| | | |
|---|---|---|
| 2,379,889 | Dorland et al. | July 10, 1945 |
| 2,485,102 | MacPherson et al. | Oct. 18, 1949 |